US007831556B2

(12) United States Patent
Behl et al.

(10) Patent No.: US 7,831,556 B2
(45) Date of Patent: Nov. 9, 2010

(54) DIFFERENTIAL RENDERING AND REFRESHING A PORTAL PAGE WITH A PAGE DELTA

(75) Inventors: Stefan Behl, Backnang (DE); Stefan Liesche, Boeblingen (DE); Andreas Nauerz, Boeblingen (DE); Juergen Schaeck, Achern (DE); Thomas Schaeck, Achern (DE)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 11/384,075

(22) Filed: Mar. 17, 2006

(65) Prior Publication Data

US 2006/0212454 A1 Sep. 21, 2006

(30) Foreign Application Priority Data

Mar. 17, 2005 (EP) .................................. 05102111

(51) Int. Cl.
*G06F 17/00* (2006.01)
(52) U.S. Cl. .................... 707/625; 715/234; 707/610; 707/613; 707/624; 707/632
(58) Field of Classification Search ................ 715/234, 715/203, 204; 707/10
See application file for complete search history.

(56) References Cited

U.S. PATENT DOCUMENTS

| 6,311,187 | B1 * | 10/2001 | Jeyaraman ................... 707/10 |
| 6,606,525 | B1 * | 8/2003 | Muthuswamy et al. ........ 700/52 |
| 6,738,804 | B1 * | 5/2004 | Lo .............................. 709/219 |
| 6,823,372 | B1 * | 11/2004 | Kreiner et al. .............. 709/218 |
| 7,117,216 | B2 * | 10/2006 | Chakraborty et al. ............... 1/1 |
| 7,428,542 | B1 * | 9/2008 | Fink et al. ......................... 1/1 |
| 7,500,181 | B2 * | 3/2009 | Kim et al. .................... 715/234 |
| 7,512,615 | B2 * | 3/2009 | Bordawekar et al. ............... 1/1 |
| 7,676,465 | B2 * | 3/2010 | Poola ................................. 1/1 |
| 2003/0149722 | A1 * | 8/2003 | Jolley et al. ................. 709/203 |
| 2003/0177175 | A1 * | 9/2003 | Worley et al. ............... 709/203 |
| 2004/0054749 | A1 * | 3/2004 | Doyle et al. ................. 709/217 |

OTHER PUBLICATIONS

Kristol & Montulli, HTTP State Management Mechanism, RFC 2109, Feb. 1997, IETF.*

* cited by examiner

*Primary Examiner*—Stephen S Hong
*Assistant Examiner*—I-Chan Yang
(74) *Attorney, Agent, or Firm*—Cuenot, Forsythe & Kim, LLC

(57) ABSTRACT

A method for differential rendering a portal page that includes a plurality of page elements (10, 12, 14) and refreshing the portal page. The method includes providing a complete portal page (20, 22). A request for the portal page is then sent and/or received (28). The request can represent user events. In a next step, page elements (10, 12, 14) of the portal page to be updated are identified (30, 31) on the basis of the user events. A page delta is then calculated (32), wherein each page element (10, 12, 14) is associated with a refresh policy depending on the semantics of the respective page element (10, 12, 14). The page delta can include the markup elements of the page elements to be updated. Next the page delta is transferred (34) to the existing portal page and merged (40) with the existing portal page.

15 Claims, 12 Drawing Sheets

DIFFERENTIAL RENDERING AND REFRESHING A PORTAL PAGE WITH A PAGE DELTA

CROSS-REFERENCE TO RELATED APPLICATIONS

This application claims the benefit of European Patent Application Serial Number 05102111.1, which was filed on Mar. 17, 2005, and which is fully incorporated herein by reference.

BACKGROUND

1. Field of the Invention

The present invention relates to a method for the differential rendering of portal pages on the server and refreshing them on the client. In particular the inventive method relates to the interaction between a server and a browser of a client.

2. Description of the Related Art

A conventional portal page aggregation system usually transfers the complete portal page. In particular, the complete markup, which corresponds with the visual representation of the portal page, is sent as a markup document from the server to the browser of the client. The markup includes all portlets and navigation elements.

There are two main disadvantages with using this approach: First, the server-side processing time for rendering the page is slow since the markup of each page element has to be requested. Second, since the markup document is very large, transfer of the markup from the server to the client results in a high data flow between server and browser.

According to an alternative conventional method, the complete page is only downloaded from the server to the browser the first time the portal page is accessed. Subsequently, the client sends separate requests for only those parts of the portal page that have changed via so-called client side includes (CSI). Accordingly the server sends the markup for each of these parts in a separate response to the browser.

However, this approach also has a major drawback: Refreshing individual page parts does not work well because the browser is not able to always determine those parts of the portal page correctly. This is a result of the browser not knowing the portal-specific semantics of the received user events. This is especially problematic if several portlets are communicatively linked, i.e. when a click into one portlet has an effect on another portlet.

SUMMARY OF THE INVENTION

It is an object of the present invention to provide a method for rendering a portal page on the server and refreshing it on the client, which improves the transfer between the server and the client and reduces the request processing time on the server.

The above object is achieved by a method as laid out in the independent claims. Further advantageous embodiments of the present invention are described in the dependent claims and are taught in the description below.

An objective of the present invention is to calculate a minimal page delta based on the user event and the current state of the portal page after the complete portal page has been initially stored. Each page element is associated with a refresh policy depending on the semantics of the respective page element. The refresh policies may be completely adapted to the semantics of the resources of the page. For example, in one arrangement the refresh of a portlet is only required if the portlet was a target of an action or if the portlet has received an event of another portlet.

The page delta can be calculated on a server and the portal page can be stored on a client. The page delta only contains markup elements of those page elements that need a refresh, typically one portlet or a small set of portlets. Accordingly only these markup elements are sent to the client. Several markup elements can be connected to markup fragments. After receiving the page delta, the client merges the contained markup fragments with the overall markup document stored on the client. In addition, the markup fragments of connected page parts are grouped to larger fragments called partitions. Thus the number of merge operations on the client can be minimized.

The inventive method has the advantage, that the overall performance of the portal application is significantly improved due to reduced data transfer between server and client as well as reduced request processing time on the server.

BRIEF DESCRIPTION OF THE DRAWINGS

Preferred embodiments of the present invention will be described below in more detail, with reference to the accompanying drawings, in which.

DETAILED DESCRIPTION OF THE INVENTION

Figure 1:
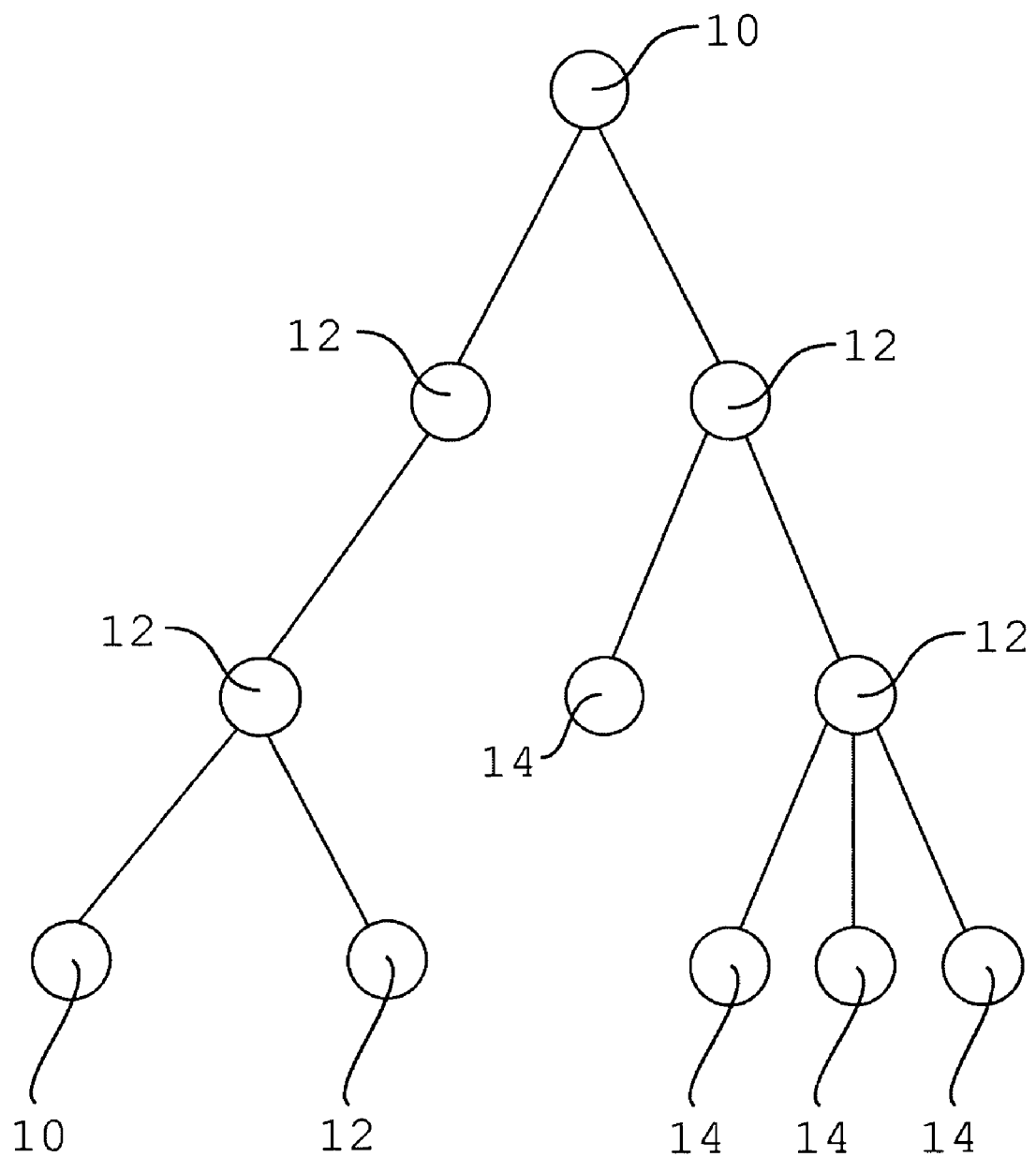
FIG. 1 shows a schematic diagram of a structure of a typical portal page.

FIG. 1 shows an example for the structure of a typical portal page, which allows the application of one embodiment of the present invention. The portal page has a hierarchical structure of page elements 10, 12 and 14. In the depicted example, the portal page includes navigation elements 10, layout elements 12 and portlets 14.

In the first two levels of the tree structure, the portal page includes nested layout elements 12, e.g. horizontal panels. In a third level, the portal page comprises two layout elements 12 and a portlet 14. In a forth level, the portal page comprises one navigation element 10, e.g. for page navigation, one layout element 12, and three portlets 14. The page elements of one level correspond with another page element in the next lower level.

Figure 2:
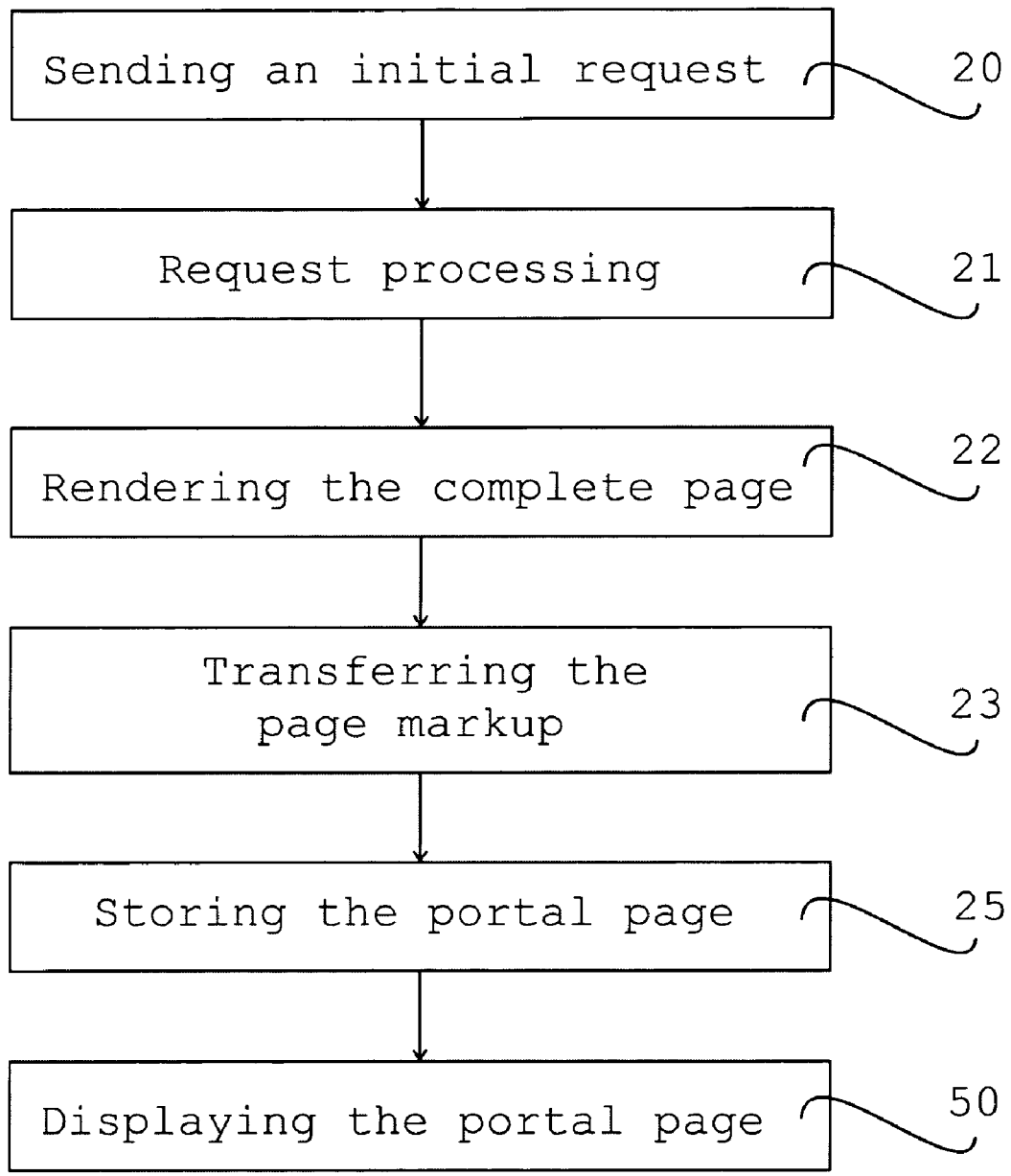
FIG. 2 shows a flow chart diagram of an embodiment of the inventive method after an initial request.

FIG. 2 shows a flow chart of another arrangement of the present invention. In a first step 20 the client sends an initial request for a given portal page to the server. In a further step 21, the portal application starts the request processing lifecycle. After the action phase, the state of the portal application is committed.

In a next step 22, the markup of the requested portal page is written to the response during the render phase. The rendering is performed by traversing the tree structure of the portal page in order to collect the markup of each visited page element. In addition to the rendering, the portal application creates a cookie, which contains information about the rendered page as a whole and the rendered elements making up that page.

In a step 23 the response is sent to the client. The response contains the page markup, the created cookie, and a script, which implements the merge algorithm required for subsequent requests. In a step 25 the received markup document, the cookie and the merge script are stored on the client. In a final step 50 the received markup document is displayed on the client.

Figure 3:
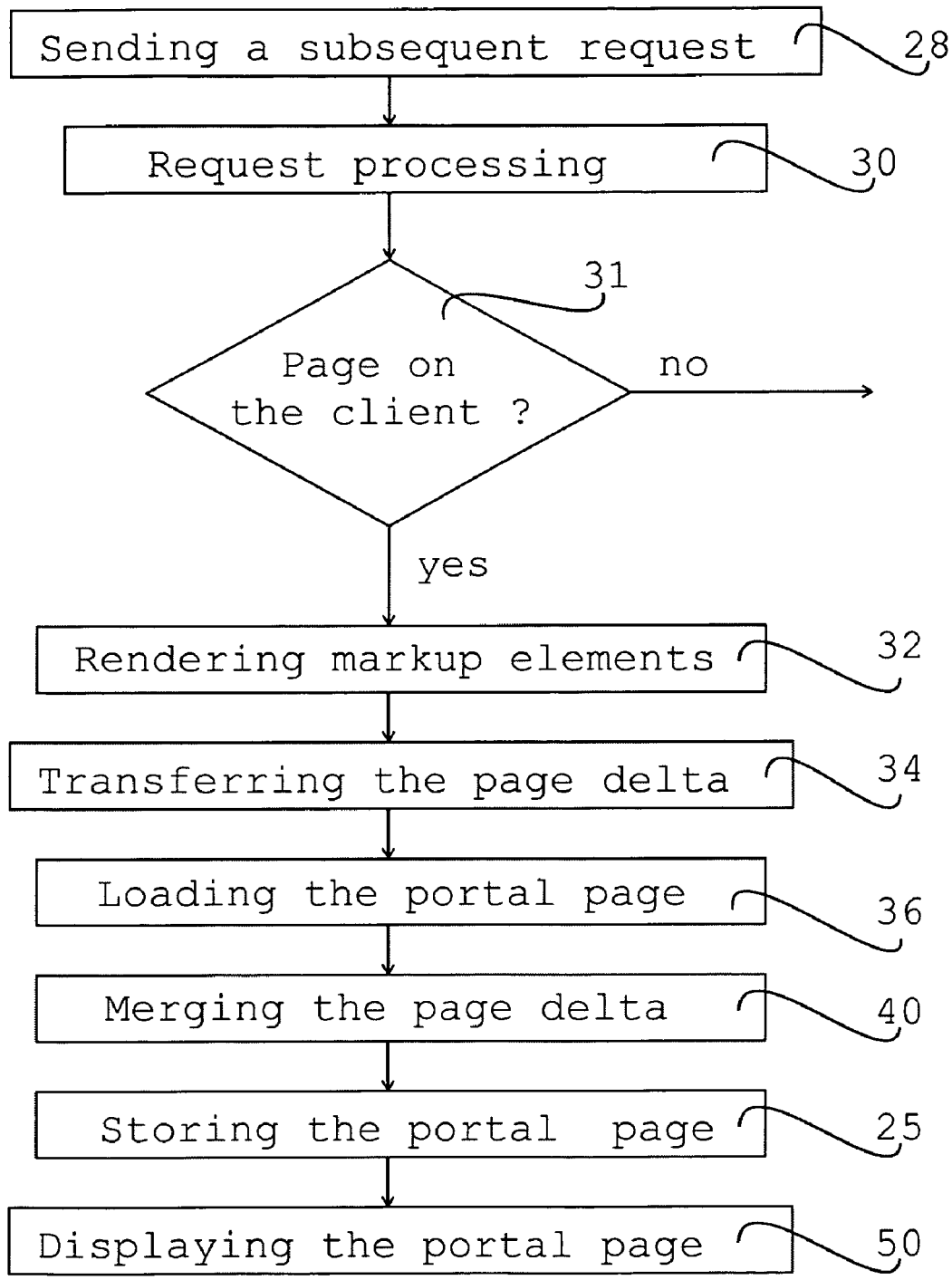
FIG. 3 shows a flow chart diagram of another embodiment of the inventive method after a subsequent request.

FIG. 3 shows a flow chart diagram of an embodiment of the inventive method for a subsequent request. In a step 28 the request for the portal page is sent from the client to the server. The cookie received via the response of the initial request for that page is sent together with this request. The cookie indicates if a version of the portal page has yet been stored on the client.

In a next step 30 the portal application starts the request processing lifecycle beginning with the initialization phase followed by the action phase. The action phase is responsible for portlet action execution. After the action phase, the state of the portal application is committed.

In a further step 31 it is checked, based on the cookie, if the requested page is already on the client. If this page is on the client, in a step 32 the render phase calculates the page delta to that page by identifying all page elements of the requested page that require a refresh. Otherwise the complete page is rendered in the same way as in the scope of the initial request.

In a step 32 only the markups for page elements which need a refresh are rendered, i.e. only the markup of those page elements are written to the response. Finally the cookie is updated as the structure of the page might have changed.

In a step 34, after the request processing has been finished, the response is sent to the client. It contains the markup reflecting the page delta as well as the updated cookie. On the client, a script function is called within the received delta markup document, which loads the markup document representing the complete page from the store on the client.

In a step 40 the merge script function is invoked, which merges the markup document representing the page delta with the loaded document representing the complete page. The resulting markup document and the cookie are stored on the client in the step 25. In the step 50 the browser displays the resulting markup document representing the refreshed page.

Figure 4:
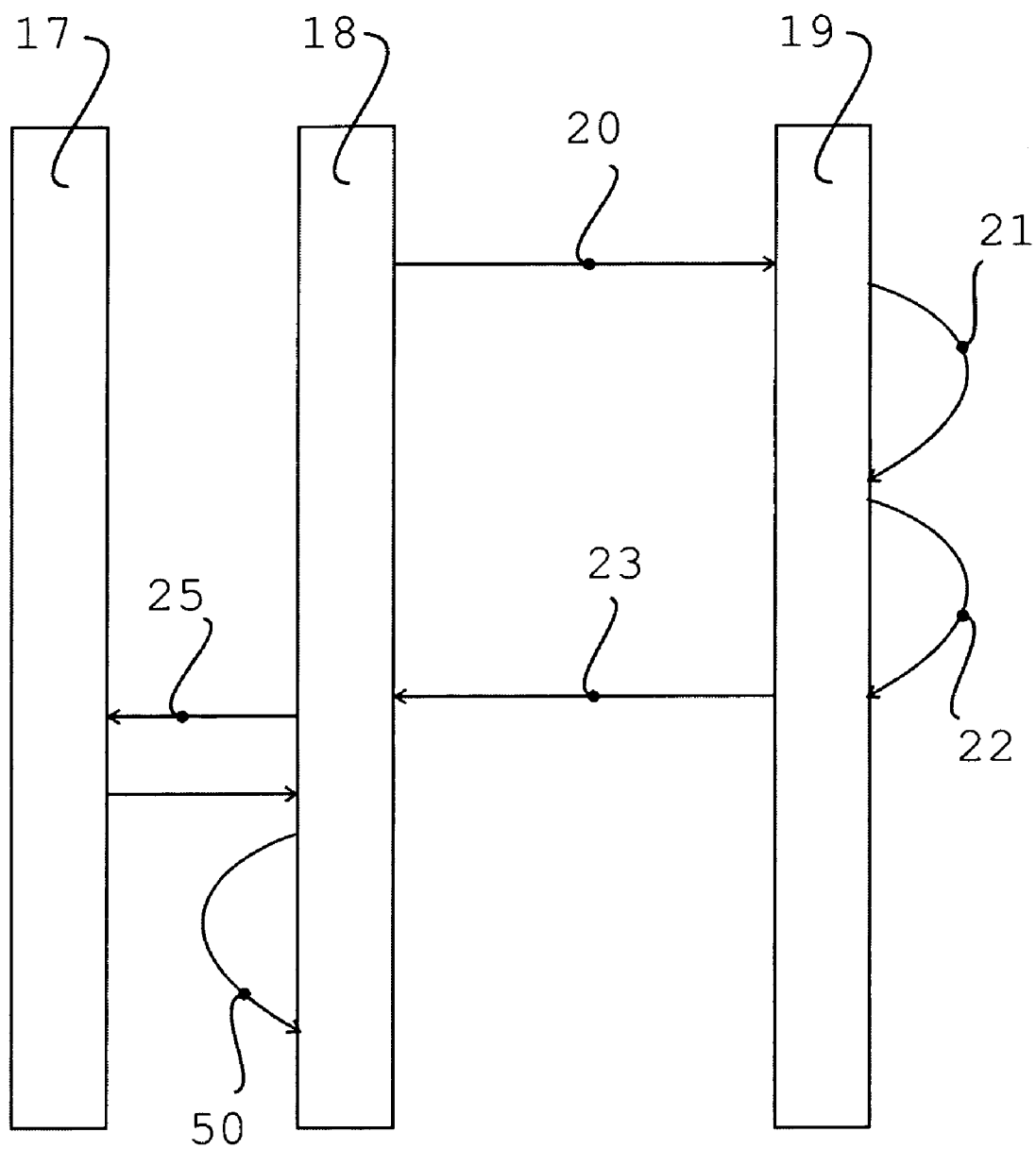
FIG. 4 shows a data flow between a server and a client after an initial request.

FIG. 4 shows the data flow between the server 19 and the client after the initial request. The client includes a browser 18 and a storage 17. In the step 20 the client sends the initial request for the portal page to the server 19. Then the portal application in the step 21 starts a request processing lifecycle beginning with an initialization phase followed by an action phase being responsible for portlet action execution. After the action phase, the state of the portal application is committed.

In the next step 22 the rendering is performed by traversing the tree structure of the portal page and writing the markup for each visited page element to the response. In addition to the rendering, the portal application creates a cookie, which contains information about the rendered page as well as the rendered page elements making up that page. To be more precise, the cookie contains a list of pages that have already been sent to the client as well as for each page a list of page parts whose markup fragments are included in the sent markup document of that page.

In the step 23 the response is sent to the client. It contains the page markup, the created cookie, and a script, e.g. JavaScript, which implements the merge algorithm required for subsequent requests. The script is sent as a separate file, e.g. a js-file, which may be cached by the browser 18 of the client.

In the step 25 the browser 18 stores the received markup document in the storage 17. The cookie and the merge script are stored in the cache of the browser 18. In the final step 50 the browser 18 displays the received markup document.

Figure 5:
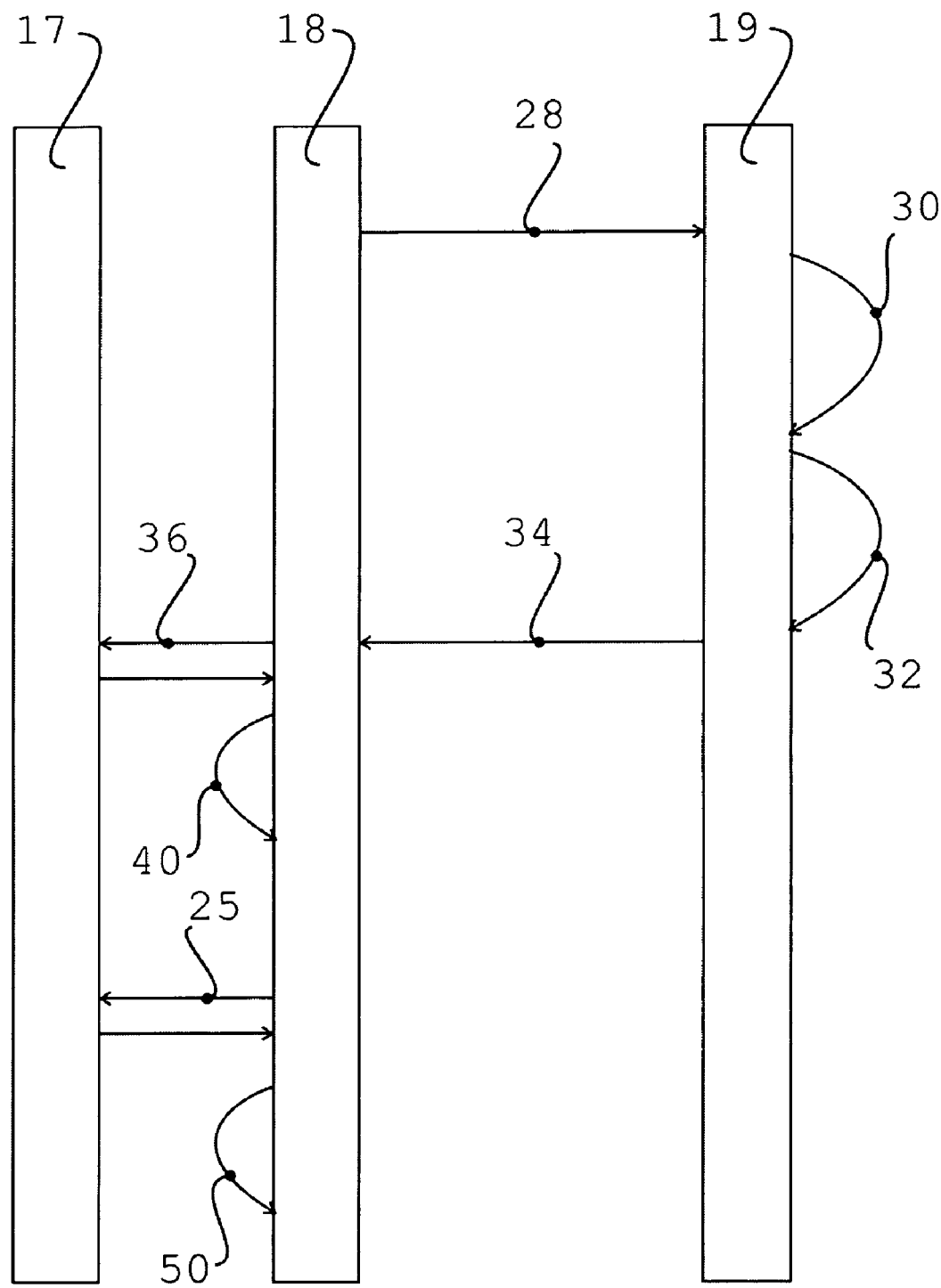
FIG. 5 shows a data flow between the server and the client after a further request.

FIG. 5 shows the data flow between the server 19 and the browser 18 in the scope of subsequent requests. In the step 28 the browser 18 sends the request reflecting the user event to the server 19. The cookie received via the response of the initial request for the respective page flows along with that request.

In the step 30 the portal application starts the request processing lifecycle beginning with the initialization phase followed by the action phase. The action phase is responsible for portlet action execution. After the action phase, the state of the portal application is committed, i.e. it is now possible to distinctly identify all those elements of the requested page, which need a refresh.

In the step 31 (shown in FIG. 3) of the render phase it is checked, on the basis of the cookie, whether the requested page is already on the client. If this is not the case, the complete page is rendered in the same way as in the scope of the initial request.

If the requested page is already stored on the client, the render phase in the step 32 calculates the page delta to that page by identifying all page elements of the requested page that require a refresh. Accordingly it merely writes the markup of those page elements to the response. Finally the cookie is updated as the structure of the page might have changed. For example a page element representing a portlet might have been added to the page during the action phase.

In the step 34 the response is sent to the client. It contains the markup reflecting the page delta as well as the updated cookie. A script function called within the received markup document of the page delta loads the markup document representing the complete page from the storage 17 of the client (step 36).

In the step 40 the merge script function is invoked, which merges the received markup document of the page delta with the document of the complete page loaded in step 36. The merge algorithm replaces the stale markup fragments in the overall markup document with the markup fragments contained in the received page delta. The resulting markup document is saved in the storage 17 of the client. The cookie is stored in the cache of the browser 18 in the step 25. In the final step 50 the browser displays the resulting markup document.

Figure 6:
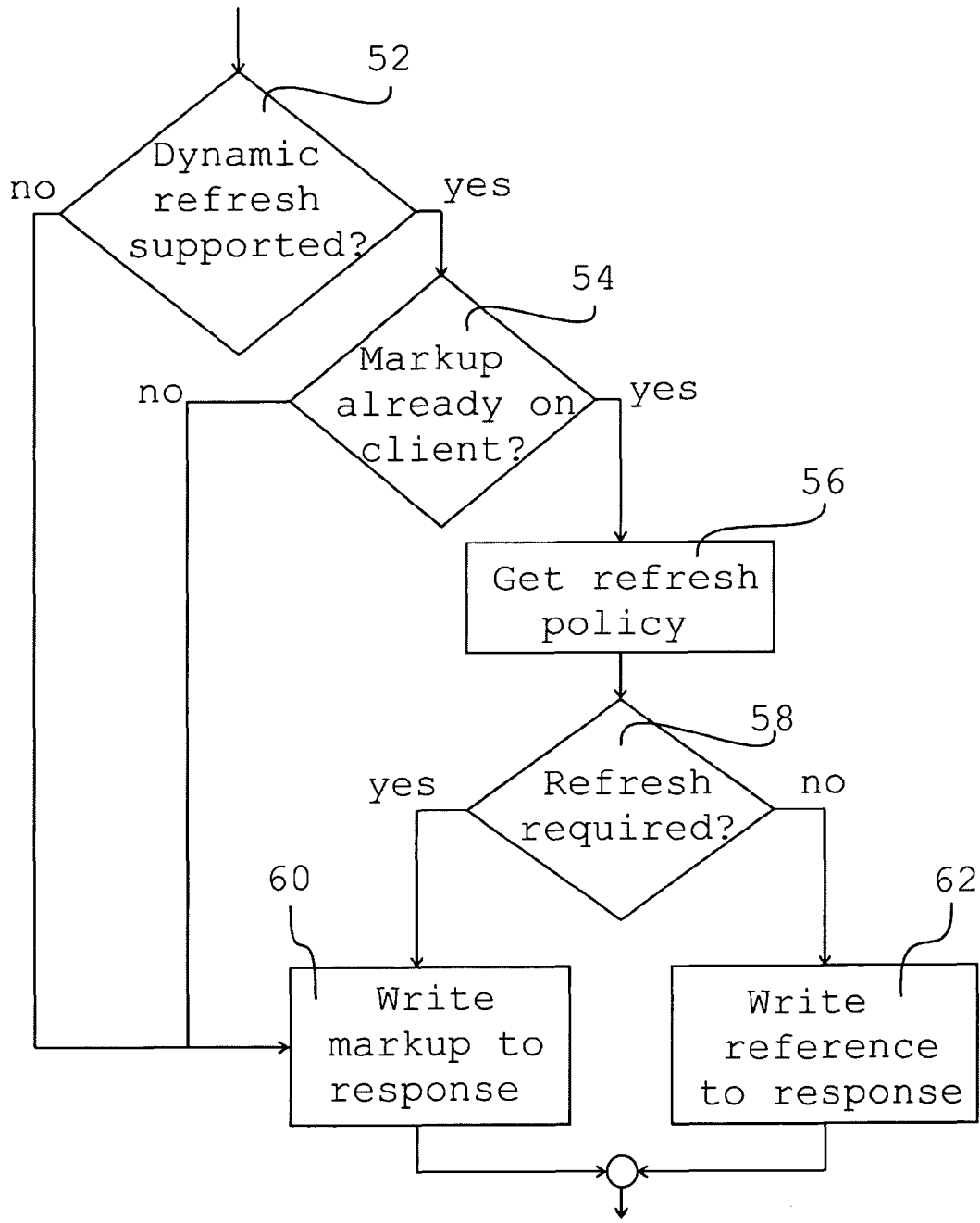
FIG. 6 shows a flow chart diagram of rendering a page delta on the server.

FIG. 6 shows a flow chart diagram of the server-side calculation of the page delta. The calculation of the page delta is performed during the render phase 22 of the request processing lifecycle. The rendering process of portal traverses the tree representation of the requested page and invokes the illustrated algorithm for each visited page element.

In a first step 52 the visited page element is asked whether it supports the dynamic refresh mechanism introduced in the scope of this invention or not. Note that not every type of page element must support this mechanism though it is strongly encouraged in order to maximize the benefits of the inventive method.

Assuming that dynamic refresh is supported, in a further step 54 the algorithm detects on the basis of the cookie, whether the markup of the visited page element is already on the client as a part of the stored markup document representing the entire portal page. Note that the mere existence of the overall markup document for the requested page on the client does not imply that the markup of a particular visited page element is contained in this document as the structure of the page might have changed during the action phase. For example, the current request might have caused the inclusion of an additional portlet into the page during the action phase.

If the markup of the page element is already on the client, in a next step 56 a refresh policy of this page element is requested and executed. As already mentioned, the refresh policy of a particular page element depends on the semantics of the respective page element. The refresh policy of a portlet, for example, might check in a step 58 whether the portlet executed an action in the scope of this request or if its markup was invalidated due to other reasons, e.g. due to a configured timeout on the server.

If a refresh is required, the page element delivers its entire markup in a step 60. If no refresh is required, in a step 62 a reference is returned, which points to the markup fragment of the page element in the markup document stored on the client.

Figure 7:
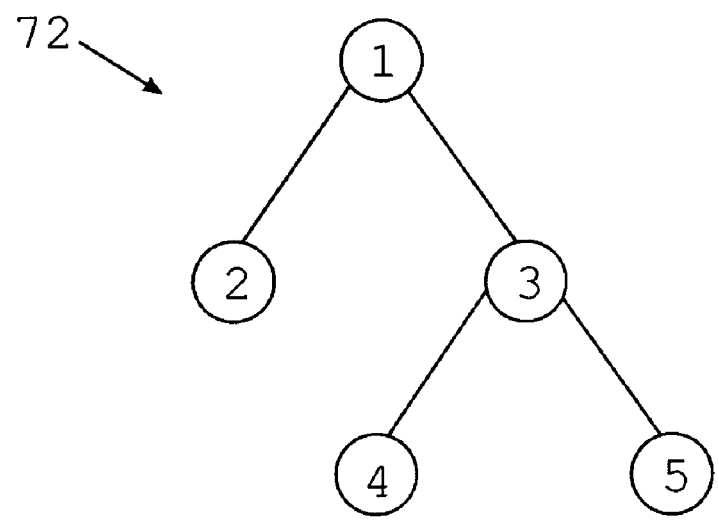
FIG. 7 shows representations of a portal page on the server and on the client.
Figure 7:
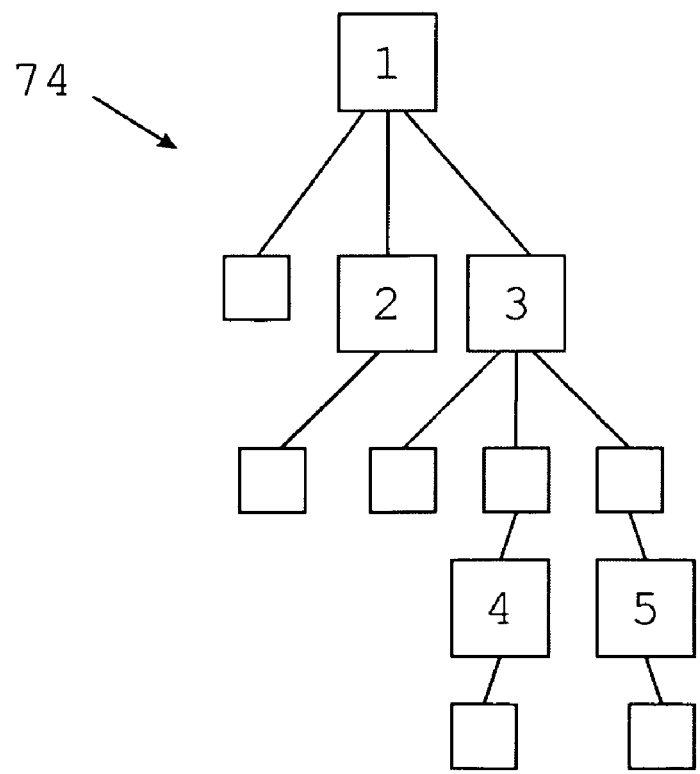

FIG. 7 shows representations of a portal page 72 on the server and of a portal page 74 on the client.

The tree of the portal page 72 on the server represents a model of the page, which abstracts from the visual representation of the page. This representation just contains those page elements which are relevant for the request processing on the server in the portal application.

Figure 8:
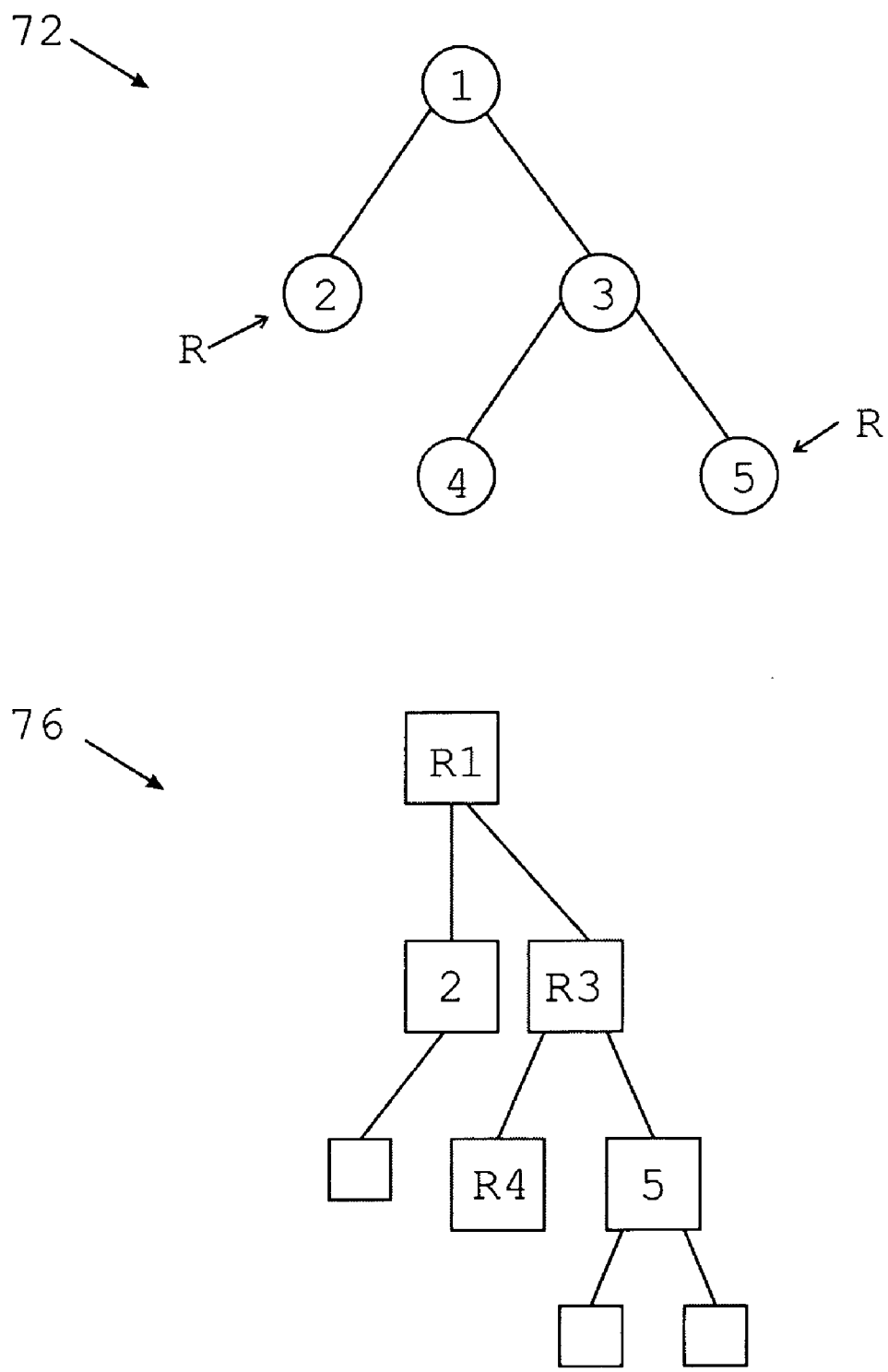
FIG. 8 shows representations of a page delta on the server and on the client.

The representation of the portal page 74 on the client corresponds to a markup document, which reflects the visual representation of the portal page 72. When using a browser of a personal computer the markup document is typically a HTML document consisting of HTML tags. As the document describes a hierarchy it can also be seen as a tree, c.f. FIG. 8. The depicted sample tree might correspond to a HTML markup document with a structure shown in Table I.

The calculation of a page delta on the server that can be applied to the page, or markup document respectively, stored on the client, requires a mapping between the two illustrated representations. This may be done by assigning each page element a unique identifier in the representation on the server. In FIG. 8 these identifiers are illustrated as numbers within circles representing the server-side page elements. During rendering a page element encodes its identifier into the root tag of its markup fragment of the page, e.g. as a special tag attribute. All other tags, which are depicted as empty squares, being part of this markup fragment need not be flagged with this identifier. The identifiers in the markup document can be easily looked up by the merge script. In FIG. 8 the root tags of the various markup fragments are depicted as squares with numbers in them representing the identifiers.

The existence of such unique identifiers within the markup document processed on the client is therefore a prerequisite for the inventive method.

Figure 9:
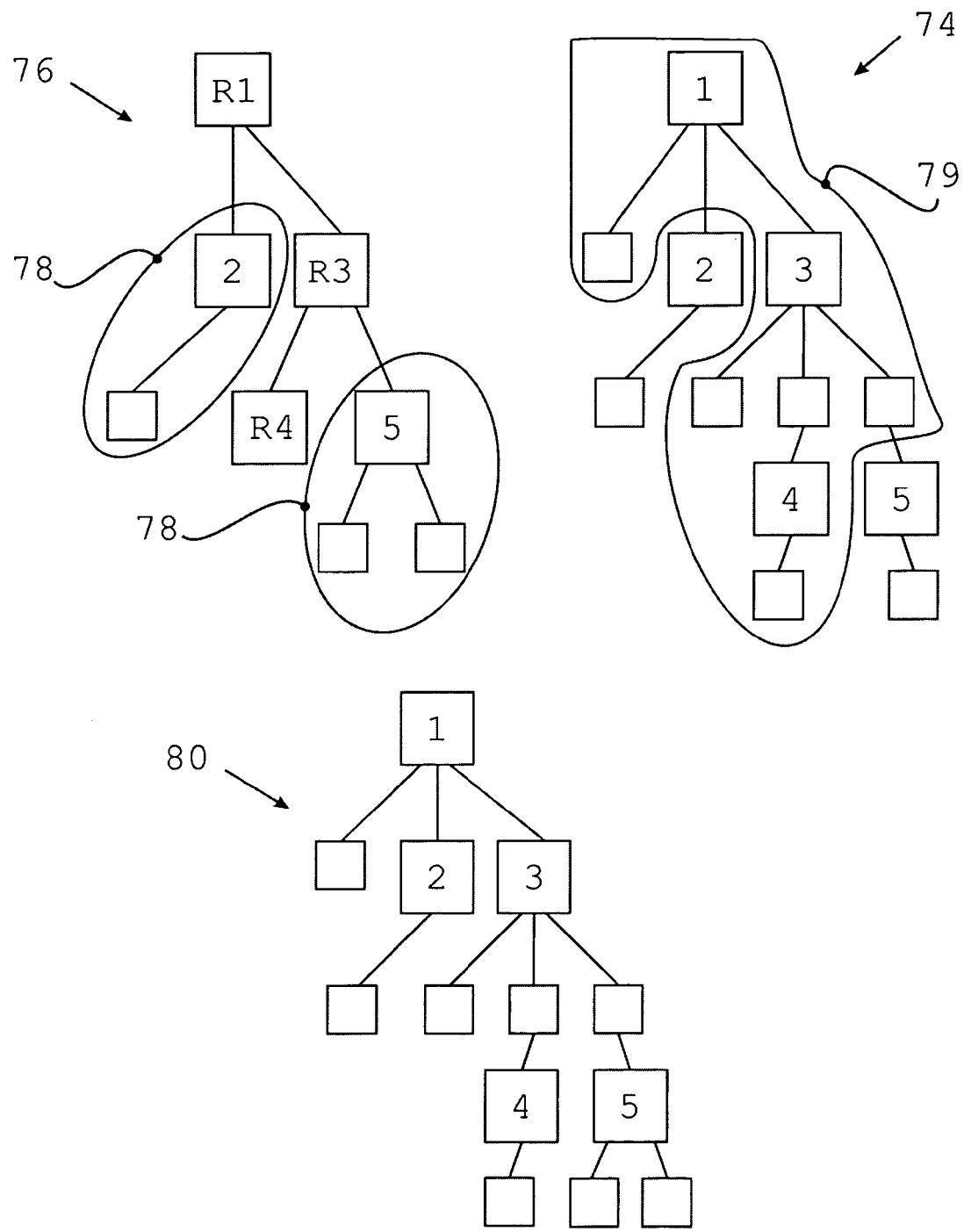
FIG. 9 shows an example of merging a page delta with a complete page on the client.

FIG. 8 shows the representation of the portal page 72 on the server 19 and a representation of a corresponding page delta 76 transferred to the client. The depicted example assumes that the page elements of the portal page 72 with the identifiers 2 and 5 are required to be refreshed. The letters R and the corresponding arrows in 72 characterize those page elements to be refreshed. The page delta 76 comprises markup fragments of those page elements needing a refresh, as well as references to unchanged markup fragments. References are custom markup tags, e.g. a ref-tag, that also contain identifiers for their resolution during the merge. In FIG. 9, references are illustrated as numbered squares prefixed with the letter "R", e.g. "R1".

The sample HTML delta markup document that corresponds with the delta tree of FIG. 9 might have a structure shown in Table II.

In the depicted sample the creation of partitions is implicit. A partition is formed from each sub-tree in the markup document consisting merely of nodes or tags, respectively, representing references. The merge algorithm detects these partitions. In the provided sample the sub-tree of the page elements with the numbers R1, R3, and R4 forms a partition. The merge script on the client detects these partitions in order to minimize the merge operations. Note that implementations also are conceivable where partitions are explicitly mapped to a special tag in the markup document.

FIG. 9 shows an example of merging the page delta 76 with the complete page 74 on the client. The page delta 76, which has been transferred from the server 19 to the client, is merged with the markup document representing the respective page 74. The markup document 74 has been stored in the client-side store 17. In the example, the received page delta contains two refreshed markup fragments 78 and three references. The merge algorithm resolves the contained references by retrieving the referenced markup fragments, or sub-trees, respectively, from the overall markup document by means of their identifiers. If the merge algorithm supports partition detection, the number of reference resolution steps can be minimized. In the depicted example, all contained references form a partition, i.e. the inclusion of the corresponding markup fragments can be done by executing one resolution step. The markup corresponding to the partition consisting of the references R1, R3, and R4 is illustrated by 79.

Note that deletions of markup fragments are implicit. Markup fragments which are part of the overall markup document that are neither referenced nor refreshed are not included into the result markup document, e.g. the former page delta. The result of this merging is a refreshed portal page 80, which should be stored in the client-side store before displaying it.

A detailed description of an implementation of the inventive method and the integration into a portal application is described below.

The following paragraphs outline a possible implementation of the inventive method on a software design level. In addition, the integration into an existing architecture of a portal application is discussed.

In the following, the term "component" denotes a self-contained coarse-granular entity in a software architecture that offers its service via an interface. If a user interface component is meant, e.g. a button, a menu or a selection list, the term "user interface component" is used explicitly.

Figure 10:
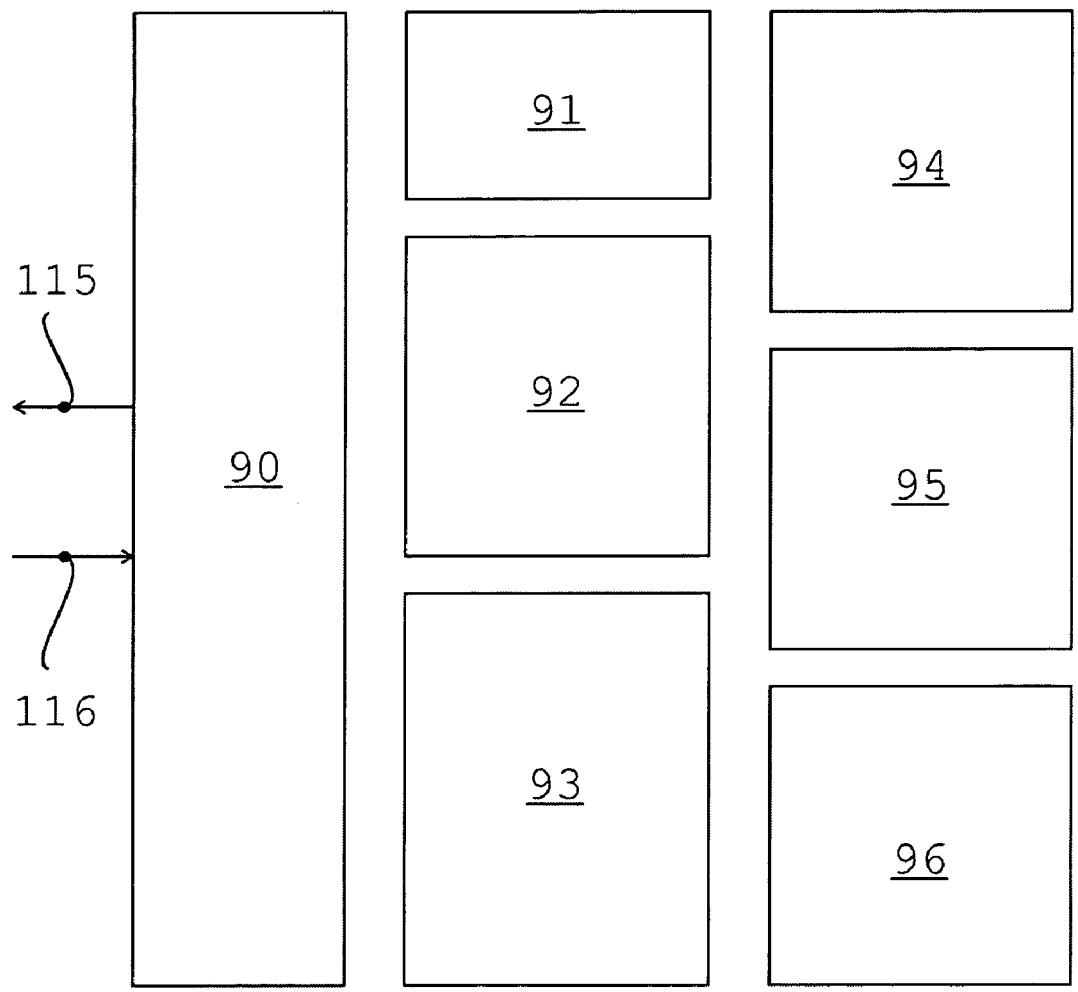
FIG. 10 shows a simplified architecture of a portal application.

FIG. 10 shows a simplified software architecture of the web sphere portal. Typically there is a so-called front controller 90, e.g. a servlet, which receives the incoming user requests and controls their processing. The user requests are initiated by multiple clients. The front controller 90 communicates with other self-contained components via their exposed interfaces in order to fulfill specific request processing tasks. An arrow 115 represents a response. An arrow 116 represents a request. The illustrated architecture is made up of the components with the responsibilities described below.

An authentication component 91 is responsible for verifying the identity of the user. Each incoming request should pass an authentication. The portal uses the user identity to determine the content the user is authorized to access as well as the commands to execute.

A command API (application programming interface) component 92 provides an abstraction layer for portal-specific commands. In particular it allows for executing commands via a unified interface. Commands may be used to perform administrative tasks such as creating and/or deleting portal pages, adding and/or removing portlets to and/or from portal pages, arranging portlets on existing pages and so on.

A model API component 94 provides a unified access, e.g. read and write access, to various models, e.g. layout models representing the layouts of portal pages or navigation models representing the hierarchy of portal pages. The provided layout models correspond to the server-side page representations as discussed above.

A state manager component 95 is responsible for handling a portal resource state, e.g. the portlet modes and/or window states of the portlets or the identifier of the currently selected portal page. It provides an API, which allows for reading as well as writing these state portions.

A portlet container 96 provides unified access to the portlets. In particular it allows for gathering the markup of a certain portlet or executing a portlet action. The portlet container invokes portlets by means of the portlet API.

An aggregation component 93 is invoked during the render phase of the request processing lifecycle. The aggregation component 93 is responsible for transforming the model of the requested page into a presentation tree. The aggregation component 93 also is responsible for writing for the response the markup that corresponds to this presentation tree.

The control flow during the action phase, which is not illustrated explicitly, can be outlined as follows.

First the front controller 90 retrieves the user action from the given request. Next, the controller 90 maps the user action or an identifying string to a certain command. The controller 90 passes in a set of parameters and executes the command via the command API component 92. The subsequent control flow depends on the semantics of the respective command.

An administrative command might load a layout model via the model API component 94 and modify this model according to the parameters passed in, for example it might add a portlet. Other kinds of commands involve the modification of a resource state via the state manager component 95 or executing a portlet action by dispatching to the portlet container component 96.

The control flow during the render phase can be outlined as follows. The front controller 90 delegates the rendering task to the aggregation component 93. The aggregation component 93 first retrieves the identifier of the requested page from the state manager component 95. Second, the aggregation component 93 loads the corresponding layout model representing the requested portlet page via the model API component 94 and transforms it into a presentation tree afterwards. Depending on the implementation of the aggregation component 93, this transformation step may vary. In an implementation based on Java server faces (JSF), for example, each resource in the loaded layout model is mapped to at least one JSF user interface component. As a final step, the resulting JSF tree is traversed and the markup of each visited user interface component is written to the response.

Figure 11:
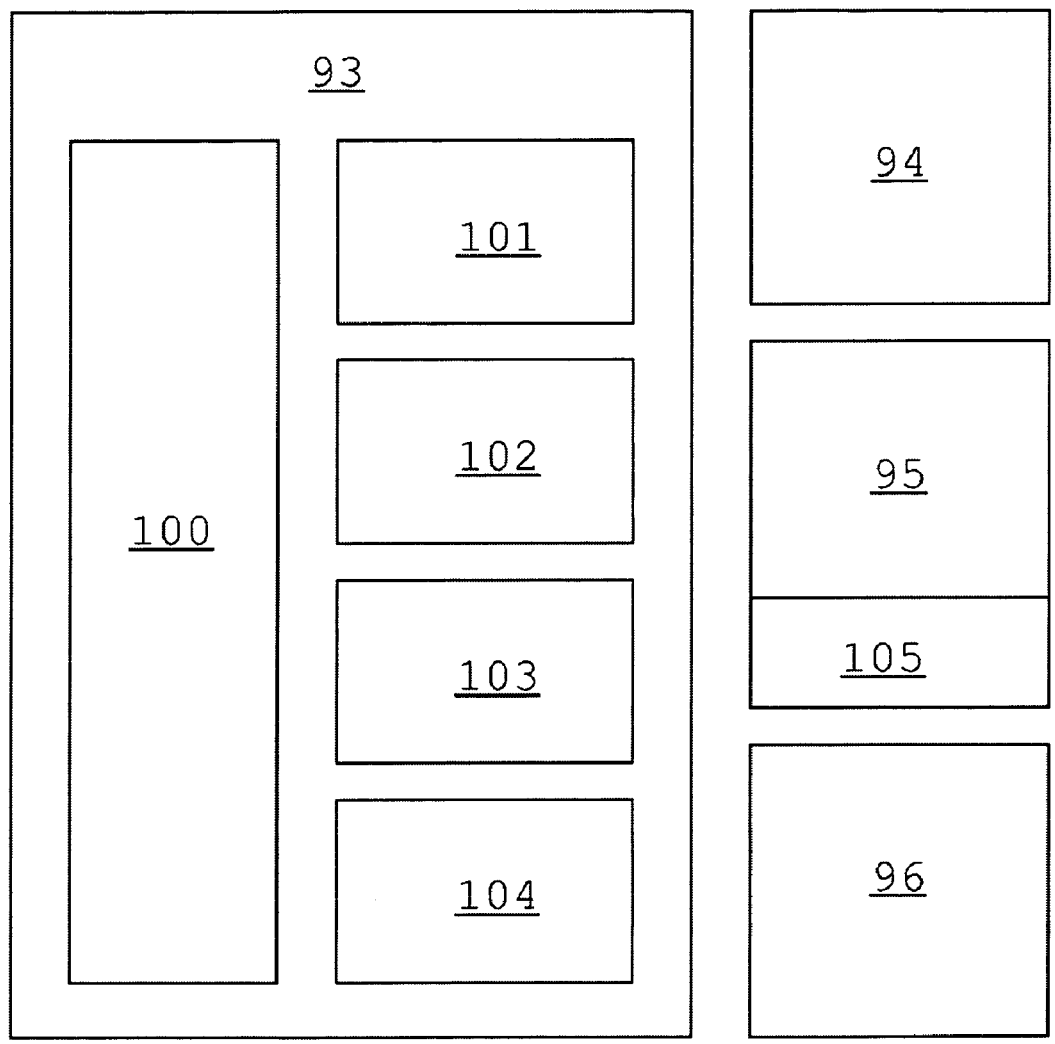
FIG. 11 shows an internal design of the Aggregation component of the portal application including the required extensions.

The implementation of the inventive method requires the adaptation of the aggregation component 93 as well as the state manager component 95. FIG. 11 illustrates these changes and extensions. It presupposes a JSF-based aggregation.

The main components in the JSF-based aggregation are illustrated as inner components nested in the aggregation component 93. A view handler component 100 controls the behavior in the render phase, i.e. the view handler component 100 is responsible for building the JSF component tree as well as invoking the renderers associated with the various user interface components. The renderers are responsible for writing the markup of a user interface component to the response.

The part of the user interface component tree representing the actual portal page, in addition to the navigation components, is the result of a layout model transformation. The abstraction layer modeling transformations corresponds with a model transformer component 101. The transformer of a layout model, for example, might traverse the given layout model and map each visited layout model resource to a JSF user interface component. As this mapping step is a complex step involving the instantiation as well as the initialization of the respective user interface component, it is also encapsulated in a self-contained component, namely in a user interface mapper component 102. To summarize, the model transformer component 101 defines the transformation strategy and uses the associated user interface mapper component 102 in order to transform one particular resource.

Figure 12:
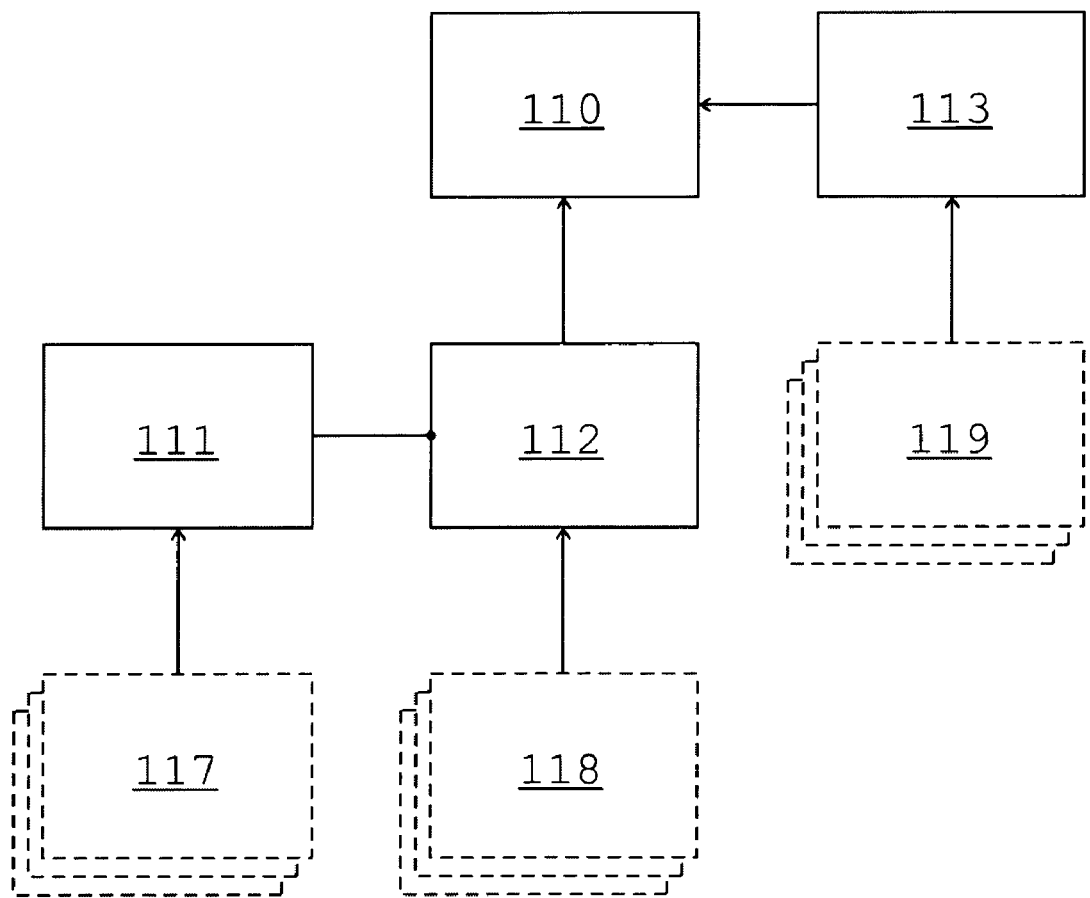
FIG. 12 shows a required framework implementing the inventive method.

The main extension is a refresh policy model component 104, which is actually a micro-framework within the aggregation component 93. As depicted in FIG. 12, this framework basically consists of a set of interfaces and generic classes implementing these interfaces, which simplify the implementation of concrete user interface components, and renderers, which support the inventive method.

The required interfaces and classes are described below in detail. By means of a so-called refresh policy holder interface 110, user interface components indicate that they support the inventive refresh method. This interface offers a "getRefreshPolicy" method, which enables renderers to get the refresh policy associated with the respective user interface component. Note that the user interface mapper component 102 must initialize each user interface component supporting the refresh policy holder interface 110 with the needed refresh policy by means of the "setRefreshPolicy" method. As the user interface mapper component 102 is able to set generic properties of arbitrary user interface components, no extensions of the user interface mapper component 102 are required to support this step.

The class of base refresh user interface components 112 is an abstract JSF user interface component, which implements the refresh policy holder interface 110. It merely reads and/or writes an instance variable representing the refresh policy. This abstract class is supposed to be extended by concrete specific user interface components 118, which support the inventive method.

Specific refresh policies 117 are modeled by means of a refresh policy interface 111. The refresh policy interface 111 provides a "RefreshRequired( )" method and is to be implemented according to the semantics of the resource using this policy.

The class of base refresh renderers 113 is an abstract implementation of specific JSF renderers 119, e.g. JSF renderers, which encapsulates the refresh algorithm as illustrated by the flow diagram of FIG. 7. This base refresh renderer 113 is also supposed to be extended by concrete renderers, which merely need to provide some methods to gather their markup in case that a refresh is required.

Required state manager component extensions 105 depicted in FIG. 11 are related to the generation of a uniform resource locator (URL). In addition to providing access to the state information, the state manager component 95 is also responsible for encoding state information into the URLs in order to support browser bookmarks and back button usage. However, as the concept of the inventive method involves the client-side storing of markup, which is likely to contain the URLs, the state information encoded into the URLs must be invariant to specific user requests. This means that the URLs may only encode the delta state portion while the base state to which the delta state refers must be encoded into the delta markup document per request, i.e. the base state must not be stored on the client. However, the state manager component 95 of the web sphere portal makes use of a flexible state handling and URL generation framework, which can be easily customized to meet this requirement.

Another discussed requirement of the inventive method is the mapping between the server-side portal page representation and the client-side markup document via identifiers. This concept may be easily put into practice when using a JSF-based aggregation as the JSF user interface model component 103 already offers the concept of a so-called client identifier.

The user interface mapper component 102, which is responsible for the user interface component initialization, sets the client identifier for each processed user interface component by deriving it from the unique identifier of the transformed resource in the model, e.g. layout model. Thus, each renderer is able to encode the client identifier of the associated user interface component into the markup of the user interface component. As the client-side merge script must be able to detect these identifiers in the markup document (i.e. in the overall markup document stored on the client as well as in the received delta markup document), the encoding into the markup needs to be implemented in a unified way. Therefore, the encoding of the client identifier of a user interface component is also performed in the class of the base refresh renderer 113.

The present invention can be realized in an entirely hardware embodiment, or an embodiment combining hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a general-purpose processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

TABLES

TABLE I

```
<table id=1 ...>
    <...>
    <span id=2 ...>
        <... />
    </span>
    <table id=3 ...>
        <... />
        <...>
            <span id=4 ...>
                <... />
            </span>
        </...>
        <...>
            <span id=5 ...>
                <... />
            </span>
        </...>
    </table>
</table>
```

TABLE II

```
<ref id=1>
    <span id=2 ...>
        <... />
    </span>
    <ref id=3>
        <ref id=4 />
        <span id=5 ...>
            <... /><... />
        </span>
    </ref>
</ref>
```

What is claimed is:

1. A computer-implemented method for differential rendering on a server and refreshing a portal page comprising a plurality of page elements, the method comprising:

storing a complete portal page;

providing the complete portal page by the server;

receiving, by the server, a request for an update of the portal page, wherein the request reflects user events;

for each page element of the portal page:

requesting, by the server, a refresh policy of the page element, wherein the refresh policy is determined based on semantics of the page element;

if a refresh to the page element is required, writing at least one markup element corresponding to the refreshed page element to a page delta, wherein the page delta is calculated on the server based on the page elements to be updated and the refresh policies for the page elements, and wherein the page delta is provided as a markup document comprising at least one markup element corresponding to the page elements to be updated; and if the refresh to the page element is not required, returning a reference in the markup document of the page delta which points to the page element in the existing portal page;

sending the page delta to the existing portal page;

detecting at least one partition in the page delta, wherein each partition is a sub-tree in the markup document of the page delta consisting a plurality of references; and merging the page delta with the existing portal page, wherein operations for merging are reduced by the use of at least one partition.

2. The method of claim 1, wherein providing the complete portal page comprises:

receiving an initial request for the portal page by the server; and sending the complete portal page by the server.

3. The method of claim 1, wherein the markup document comprises references to unchanged markup elements in the existing portal page.

4. The method of claim 1, further comprising checking if a dynamic refresh is supported.

5. The method of claim 1, wherein a cookie is created and transferred along with the portal page or the page delta, respectively.

6. The method claim 5, wherein the cookie is updated during updating of the page elements and transferred along with the created page delta.

7. The method of claim 1, wherein the page elements are connected to at least one fragment.

8. The method of claim 7, wherein at least one markup element corresponds with the at least one fragment.

9. The method of claim 1, wherein the page elements are navigation elements, layout elements and/or portlets.

10. The method of claim 1, wherein the portal page comprises a hierarchical structure of the page elements.

11. The method of claim 10, wherein the portal page comprises a tree structure of the page elements.

12. A system comprising:

a storage means;

a first processor configured to execute components comprising:

a view handler component that identifies page elements to be updated;

a model transformer component that defines a transform strategy in order to transform a particular resource;

a user interface mapper component that initializes user interface components; and a refresh policy model component that depends on semantics of the page elements and for each page element of a portal page:

request a refresh policy of the page element, wherein the refresh policy is determined based on semantics of the page element;

if a refresh to the page element is required, write at least one markup element corresponding to the refreshed page element to a page delta, wherein the page delta is calculated based on the page elements to be updated and the refresh policies for the page elements, and wherein the page delta is provided as a markup document comprising at least one markup element corresponding to the page elements to be updated; and if the refresh to the page element is not required, return a reference in the markup document of the page delta which points to the page element in the portal page; and a second processor configured to:

detect at least one partition in the page delta, wherein each partition is a sub-tree in the markup document of the page delta consisting a plurality of references; and merge the page delta with the portal page, wherein operations for merging are reduced by the use of at least one partition.

13. The system of claim 12, wherein the system comprises a user interface model component that maps between a server-side portal page representation and a client-side markup document via identifiers.

14. The system of claim 12, wherein the refresh policy model component comprises:

a refresh policy holder interface that indicates those user interface components supporting the refresh method;

a refresh policy interface that models refresh policies;

a base refresh user interface component that implements the refresh policy holder interface; and a base refresh renderer that encapsulates the refresh algorithm.

15. A machine readable storage having stored thereon a computer program having a plurality of code sections comprising:

code for providing a complete portal page by a server;

code for receiving, by the server, a request for the portal page, wherein the request reflects user events;

for each page element of the portal page:

code for requesting, by the server, a refresh policy of the page element, wherein the refresh policy is determined based on semantics of the page element;

code for, if a refresh to the page element is required, writing at least one markup element corresponding to the refreshed page element to a page delta, wherein the page delta is calculated on the server based on the page elements to be updated and the refresh policies for the page elements, and wherein the page delta is provided as a markup document comprising at least one markup element corresponding to the page elements to be updated; and code for, if the refresh to the page element is not required, returning a reference in the markup document of the page delta which points to the page element in the existing portal page, code for sending the page delta to the existing portal page;

code for detecting at least one partition in the page delta, wherein each partition is a sub-tree in the markup document of the page delta consisting a plurality of references; and code for merging the page delta with the existing portal page, wherein operations for merging are reduced by the use of at least one partition.

\* \* \* \* \*